United States Patent [19]

Kokubu

[11] Patent Number: 5,128,597
[45] Date of Patent: Jul. 7, 1992

[54] CONTROL APPARATUS FOR POWER WINDOW REGULATOR

[75] Inventor: Sadao Kokubu, Aichi, Japan

[73] Assignee: Kabushiki Kaisha Tokai-Rika-Denki-Seisakusho, Japan

[21] Appl. No.: 711,861

[22] Filed: Jun. 7, 1991

[30] Foreign Application Priority Data

Jun. 14, 1990 [JP] Japan .................. 2-156048
Jun. 19, 1990 [JP] Japan .................. 2-160925
Jun. 22, 1990 [JP] Japan .................. 2-164868

[51] Int. Cl.$^5$ .............................. B60J 1/12; H02P 1/22
[52] U.S. Cl. ................................... 318/286; 318/266; 318/468
[58] Field of Search ............... 318/255, 256, 264, 265, 318/266, 267, 280, 283, 286, 287, 288, 289, 291, 293, 294, 466, 467, 468

[56] References Cited

U.S. PATENT DOCUMENTS

| | | | |
|---|---|---|---|
| 4,001,661 | 1/1977 | Terabayashi | 318/264 |
| 4,621,223 | 11/1986 | Murakami et al. | 318/282 |
| 4,678,975 | 7/1987 | Vrabel et al. | |
| 4,709,196 | 11/1987 | Mizuta | 318/282 |
| 4,746,845 | 5/1988 | Mizuta et al. | 318/286 |
| 4,900,994 | 2/1990 | Mizuta | 318/283 |
| 4,931,714 | 6/1990 | Yamamoto | 318/663 |
| 5,023,529 | 6/1991 | Tennant | 318/266 |

FOREIGN PATENT DOCUMENTS

2217533 10/1989 United Kingdom.

Primary Examiner—Bentsu Ro
Attorney, Agent, or Firm—Sixbey, Friedman, Leedom & Ferguson

[57] ABSTRACT

A control apparatus suitable for use in a power window regulator is provided which has an electric motor for selectively moving a window glass in either one of two directions in which the window glass is fully closed and opened when an automode switch is first turned on. An energized state of the motor is held until the window glass reaches a position where it is fully closed or opened. The control apparatus comprises a capacitor, a holding circuit for holding the motor in an energized state during a period in which a detection voltage corresponding to a voltage applied across the capacitor is greater than a reference voltage, a cut-off circuit for discharging the electric charge stored in the capacitor in accordance with a predetermined time constant when a cut-off voltage exceeds an auxiliary reference voltage, and a clamping circuit for clamping the detection voltage to a constant voltage higher than the reference voltage when the discharge of the electric charge stored in the capacitor is initiated by the cut-off circuit. The cut-off circuit serves to clamp the detection voltage to the constant voltage higher than the reference voltage, and the time necessary to tighten the window glass corresponds to the period of time required to reduce the constant voltage thus clamped up to the reference voltage, thus achieving a constant period of time at all times.

17 Claims, 6 Drawing Sheets

CONTROL APPARATUS FOR POWER WINDOW REGULATOR

BACKGROUND OF THE INVENTION

1. Field of the Invention

The present invention relates to a control apparatus suitable for use in a power window regulator, of a type wherein a window glass is opened and/or closed by making use of an electric motor.

2. Description of the Related Art

There is generally known a control apparatus suitable for use in a power window regulator mounted on a door on the side of a driver's seat of an automobile, to which an auto mode has been set in addition to a normally-used manual mode. In the above-described control apparatus, currents in forward and reverse directions are caused to flow in an electric motor so as to carry out the movement of a window glass in upward and downward directions, and two relays are used so as to form two electrical paths for causing the currents in the forward and reverse directions to flow in the motor.

The actuation of the respective relays in the manual mode is controlled by first and second switching devices (transistors are often used to facilitate control of the relays at the time of the auto mode) which are turned on and off in response to respective operations of a manually-operated window glass move-up switch and a manually-operated window glass move-down switch. More specifically, a first relay is actuated by the first switching device during a period in which the manually-operated window glass move-up switch is turned on so as to form an electrical path for causing the current in the forward direction to flow in the motor. On the other hand, a second relay is actuated by the second switching device during a period in which the manually-operated window glass move-down switch is turned on so as to form an electrical path for causing the current in the reverse direction to flow in the motor. Thus, the window glass is moved upward and downward in the manual mode.

There has been proposed a holding circuit, to be described later, in order to control the actuation of the respective relays at the time of the auto mode. More specifically, the holding circuit has a first capacitor charged immediately when an automatically-operated window glass move-up switch is turned on in a state in which the first relay is actuated (i.e., in a state in which the first switching device is turned on), and a second capacitor charged immediately when an automatically-operated window glass move-down switch is turned on in a state in which the second relay is actuated (i.e., in a state in which the second switching device is turned on). The holding circuit also has a comparing circuit for holding either the first switching device or the second switching device in an on state during a period in which a voltage applied across one of the first and second capacitors is greater in level than a specified voltage. Thus, when either the automatically-operated window glass move-up switch or the automatically-operated window glass move-down switch is first turned on, the first or second switching device is held on even after either the window glass move-up switch or the window glass move-down switch is turned off. As a consequence, the window glass is moved in an upward direction (i.e., in a direction in which the window glass is closed) or in a downward direction (i.e., in a direction in which it is opened) during a period in which either the first or second switching device is held on.

In this case, the holding circuit is incidentally provided with a cut-off circuit activated so as to detect a locked-motor current which flows in the motor. The cut-off circuit serves to rapidly discharge electric charges stored in the first and second capacitors in response to its operation. Thus, when the window glass is moved to a position where it is fully closed or opened, the cut-off circuit is activated to reduce the voltage applied across each of the first and second capacitors to the specified voltage or below in level. Therefore, the comparing circuit serves to release each switching device from being held on, and hence the respective relays are de-actuated correspondingly so as to de-energize the motor. As a consequence, the window glass is automatically stopped in the window glass fully closed or opened position.

The electric charges stored in the first and second capacitors are discharged through resistors in accordance with a relatively long time constant, and a timer function is determined by the discharge of the first and second capacitors. More specifically, unless the cut-off circuit is normally operated, the voltage applied across each of the first and second capacitors is reduced to the specified voltage or lower in level by discharging the first and second capacitors through the resistors after a predetermined period of time elapses. Therefore, the comparing circuit serves to release the switching devices from being held on, thereby de-energizing the motor. As a consequence, the motor can be prevented from being energized over an excessively long time.

Further, when the first switching device is turned on, the electric charge stored in the second capacitor is discharged instantaneously through the first switching device. On the other hand, when the second switching device is turned on, the electric charge stored in the first capacitor is discharged momentarily through the second switching device. As a result, when the manually-operated window glass move-down switch is turned on while the window glass is being moved in the upward direction in the auto mode, the electric charge stored in the first capacitor is discharged instantaneously through the second switching device, thus releasing the second switching device from being held on by the holding circuit so as to stop the movement of the window glass in the upward direction at once. On the other hand, when the manually-operated window glass move-up switch is turned on while the window glass is being moved in the downward direction in the auto mode, the electric charge stored in the second capacitor is discharged immediately through the first switching device, thus releasing the first switching device from being held on by the holding circuit so as to immediately stop the movement of the window glass in the downward direction.

According to the conventional arrangement, there are provided first and second capacitors as components for the timer, which are used to prevent the motor from being abnormally energized, in order to accomplish the function of canceling the movement of the window glass in the upward and downward directions at the time of the auto mode as described above. With this arrangement, the first and second capacitors used have a relatively large capacity to meet the need for an increase in a discharge time constant used for the timer function. However, since such capacitors are large in size and relatively expensive, the control apparatus is enlarged as a whole and subjected to an increase in manufacturing cost when two capacitors having relatively large capacities are required, as in the conventional arrangement. Thus, this inconvenience remains an unsolved problem, the solution of which is an object of the invention.

SUMMARY OF THE INVENTION

With the foregoing problem in view, it is an object of the present invention to provide a control apparatus suitable for use in a power window regulator, of a type wherein only one capacitor as a component for a timer necessary for the prevention of an electric motor from being abnormally energized may be provided to accomplish the function of canceling the movement of a window glass in upward and downward directions at the time of an auto mode while being in the course of its movement, thereby making it possible to reduce the control apparatus in size as a whole and reduce its manufacturing cost, and a circuit arrangement for the purpose of realization of such an effect can be simplified to the utmost.

In order to achieve the above object of the present invention, there is provided a control apparatus suitable for use in a power window regulator, comprising first and second relays selectively actuated when first and second manually-operated mode switches are turned on and used to form an electrical path for causing electric current in the forward direction to flow in an electric motor and an electrical path for causing electric current in the reverse direction to flow in the motor, respectively, the motor being activated to move a window glass in directions in which it is closed and opened in response to the supply of electric current in the forward and reverse directions to the motor when the first and second relays are in operation respectively; an automode switch for automatically moving the window glass to a position where the window glass is fully closed or opened when either one of the first and second relays is actuated to turn on; a capacitor serving as a component for a timer, for discharging an electric charge stored therein after the capacitor is charged up to a predetermined voltage level upon turning on the automode switch; a holding circuit for holding either one of the first and second relays in the conducting state in which the current in either forward or reverse direction is caused to flow in the motor, during a period in which a detection voltage corresponding to a voltage applied across the capacitor is greater than a reference voltage; a cutoff circuit for discharging the electric charge stored in the capacitor when the window glass is moved to the position where it is fully closed or opened; and a varying circuit for varying the reference voltage so as to be higher than the detection voltage when the first and second relays are both actuated.

With the above arrangement, when the automode switch is turned on in a state in which either one of the first and second relays is actuated, the discharge of the electric charge stored in the capacitor is initiated after the capacitor as the component for the time is charged to the predetermined voltage level, and the detection voltage corresponding to the voltage applied across the capacitor is continuously maintained at a level higher than that of the reference voltage only for a predetermined period of time set by the timer. As a consequence, the holding circuit serves to hold either one of the relays while in operation as it is. Even after the automode switch and each of the first and second manually-operated mode switches are turned off, the window glass is continuously moved in the direction in which it is closed or opened, only for a predetermined period of time. When the window glass reaches the position where it is fully closed or opened, the cut-off circuit serves to discharge the electric charge in the capacitor, so that the detection voltage is reduced to the reference voltage or below. As a result, either one of the relays is released from being actuated and held by the holding circuit and hence the motor is automatically de-energized.

When it is desired to cancel the automatic movement of the window glass in the upward and downward directions in the course of its movement, the manually-operated mode switch for moving the window glass in the direction opposite to the direction in which it is being moved is turned on so as to actuate both of the first and second relays. As a consequence, the reference voltage is varied in level so as to be higher than the detection voltage by the varying circuit, and hence the holding circuit serves to release the relays from being actuated and held by the holding circuit. Thus, the motor is de-energized so as to stop the automatic movement of the window glass.

According to the present invention, as described above, there is provided a control apparatus suitable for use in the power window regulator, which is capable of holding the movement of a window glass in the auto mode on the basis of a detection voltage corresponding to a voltage applied across the capacitor as the component for the timer, characterized in that since only one capacitor is provided, the control apparatus can be reduced in size as a whole and its manufacturing cost can be reduced, and the circuit arrangement for the purpose of realization of such an effect can be simplified to the utmost.

According to one aspect of the present invention, the control apparatus is further provided with a clamping circuit for clamping the detection voltage to a constant voltage higher than the reference voltage when the discharge of the electric charge stored in the capacitor is initiated by the cut-off circuit.

According to this aspect, when the discharge of the electric charge in the capacitor is initiated by the cut-off circuit, the clamping circuit serves to clamp the detection voltage to the constant voltage higher than the reference voltage. This establishes a window glass tightening time, beginning at the moment that the window glass reaches the position where it is fully closed or opened, and corresponding to the period of time required to reduce the detection voltage gradually reduced in response to the discharge of the electric charge in the capacitor from the thus clamped constant voltage to the reference voltage, thereby showing a constant period of time at all times.

Further, according to another aspect of the present invention, the control apparatus further includes a voltage varying circuit activated so as to reduce the reference voltage when the discharge of the electric charge stored in the capacitor is initiated by the cut-off circuit.

According to this aspect, the reference voltage is reduced when the discharge of the electric charge stored in the capacitor is initiated by the cut-off circuit. It is therefore possible to set a clamping voltage from the clamping circuit at a low level. As a result, the detection voltage can be clamped to a constant voltage lower than the detection voltage even when the time required for the window glass to reach the position where it is fully closed or opened is excessively prolonged, thereby making it possible to reliably make the tightening time of the window glass constant.

According to a further aspect of the present invention, there is provided a control apparatus wherein an automode switch is provided so as to be turned on together with the turning on of either one of the first and second relays, and the first and second relays have relay coils energized when the first and second manually-operated mode switches are turned on and the normally-open contacts turned on when the relay coils are energized, respectively, the apparatus further including a first semiconductor switching device for forming an electrical path for energization of the relay coil of the first relay through the normally-open contacts of the first relay when the automode switch is turned on together with the first manually-operated mode switch, and a second semiconductor switching device for forming an electrical path for energization of the relay coil of the second relay through the normally-open contacts of the second relay when the automode switch is turned on together with the second manually-operated mode switch.

According to this further aspect, when the first manually-operated mode switch is turned on, the relay coil of the first relay is energized by a power supply through the first manually-operated mode switch, thereby enabling the first relay to form an electrical path for causing the current in the forward direction to flow in the motor. As a consequence, the window glass is moved in its closing direction in response to the supply of the current in the forward direction to the motor. On the other hand, when the second manually-operated mode switch is turned on, the relay coil of the second relay is energized by the power supply through the second manually-operated mode switch, thereby enabling the second relay to form an electrical path for causing the current in the reverse direction to flow in the motor. As a consequence, the window glass is moved in its opening direction in response to the supply of the current in the reverse direction to the motor.

The relay coils of the first and second relays are energized directly through the first and second manually-operated mode switches, respectively. Therefore, the present invention is not subjected to reduction in the reliability of relay control as in the conventional arrangement of such a type that the relays are controlled through semiconductor switching devices.

On the other hand, when the automode switch is turned on together with the first manually-operated mode switch, the relay coil of the first relay is energized in response to the turning on of the first manually-operated mode switch so as to form an electrical path for causing the current in the forward direction to flow in the motor. At the same time, an electrical path for energization of the relay coil of the first relay is formed by the first semiconductor switching device and the normally-open contacts of the first relay, and the holding circuit serves to hold the first relay in the conducting state even after the automode switch and the first manually-operated mode switch are turned off. Thus, when the window glass is continuously moved in its closing direction and reaches the position where it is fully closed, the first relay is released from being held in the conducting state by the holding circuit so as to turn off the first semiconductor switching device, thereby automatically deenergizing the motor.

In this case, an electrical path for energization of the relay coil of the second relay used to form the electrical path for causing the current in the reverse direction to flow in the motor is formed by the normally-open contacts of the second relay and the second semiconductor switching device. However, at this time, the relay coil referred to above is in a deenergized state and the normally-open contacts are turned off. Therefore, the second semiconductor switching device is electrically disconnected from the power supply. Accordingly, the power supply is not applied to the second semiconductor switching device even while the window glass is being moved in its closing direction in the auto mode. It is also possible to avoid a tendency of the second semiconductor switching device to malfunction due to noise caused by changing the movement of the window glass in the upward and downward directions irregularly.

When the automode switch is turned on together with the second manually-operated switch, the relay coil of the second relay is energized in response to the turning on of the second manually-operated mode switch so as to form an electrical path for causing the current in the reverse direction to flow in the motor. At the same time, an electrical path for energization of the relay coil of the second relay is formed by the second semiconductor switching device and the normally-open contacts of the second relay, and the holding circuit serves to hold the second relay in the conducting state even after the automode switch and the second manually-operated mode switch are turned off. Thus, when the window glass is continuously moved in its opening direction and reaches the position where it is fully opened, the second relay is released from being held in the conducting state by the holding circuit so as to turn off the second semiconductor switching device, thereby automatically de-energizing the motor.

In this case, an electrical path for energization of the relay coil of the first relay used to form the electrical path for causing the current in the forward direction to flow in the motor is formed by the normally-open contacts of the first relay and the first semiconductor switching device. However, at this time, the relay coil referred to above is in a de-energized state and the normally-open contacts are turned off. Therefore, the first semiconductor switching device is electrically disconnected from the power supply. Accordingly, the power supply is not applied to the first semiconductor switching device even while the window glass is being moved in its opening direction in the auto mode. It is also possible to avoid a tendency of the first semiconductor switching device to malfunction due to noise caused by changing the movement of the window glass in the upward and downward directions irregularly.

DETAILED DESCRIPTION OF THE PREFERRED EMBODIMENTS

A first embodiment according to the present invention applied to a power window regulator which is provided on the driver's seat side of an automobile will hereinafter be described with reference to the accompanying drawings.

Figure 1:
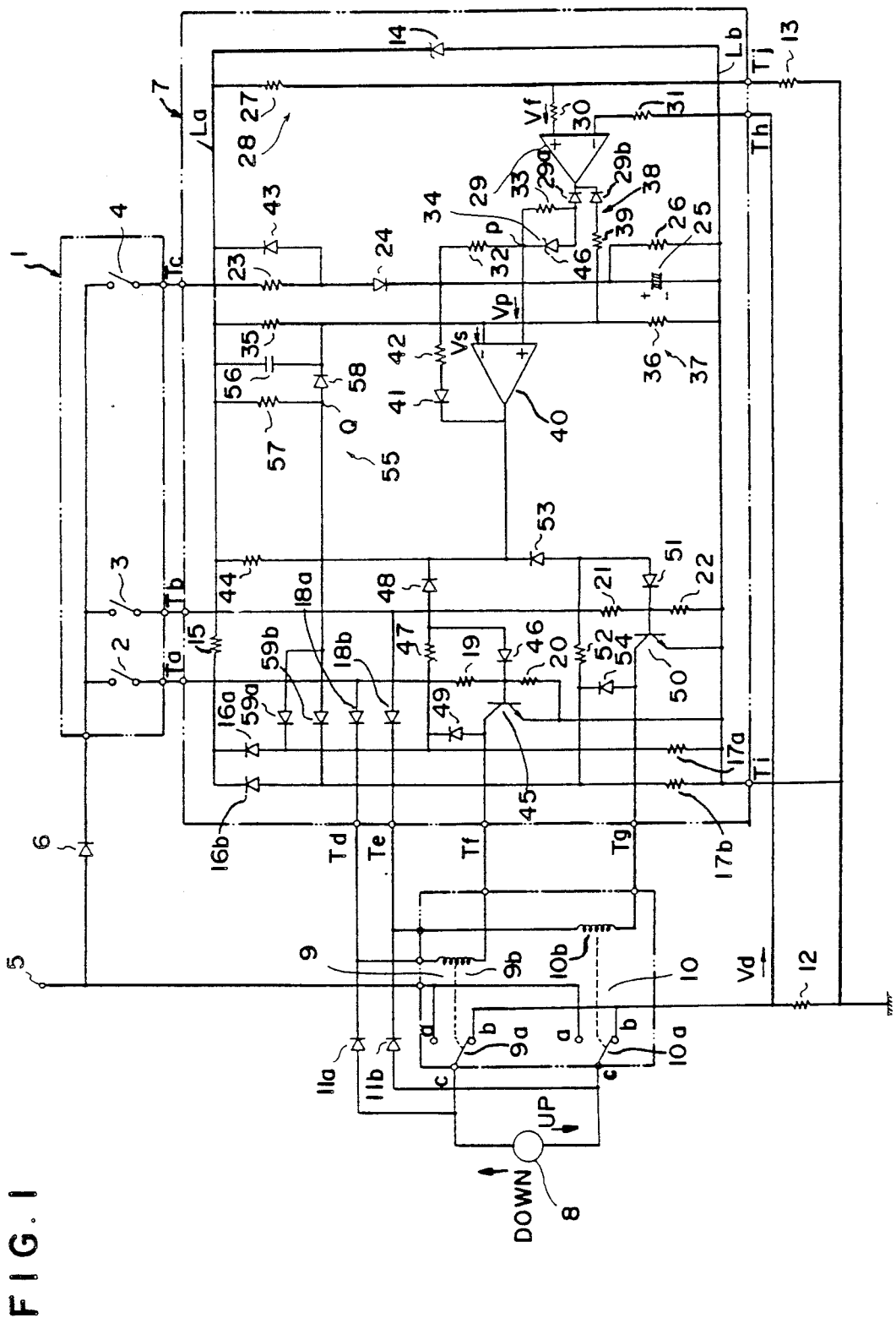
FIG. 1 is a circuit diagram showing a first embodiment of the present invention.

Referring to FIG. 1, a power window switch 1 provided in such a manner that it can be operated from the automobile driver's seat comprises a manually-operated window glass move-up switch 2, a manually-operated window glass move-down switch 3, and an automode switch 4 as well as a control knob (not shown) operable in forward and backward directions, for example, from a neutral position. Each of these switches 2 through 4 can be automatically reset, and is normally held in the off position when the control knob is set in the neutral position, i.e., when it is in a non-operated state. When the control knob is operated a predetermined amount in the forward direction from the non-operated state of the control knob, the switch 2 is turned on. On the other hand, when the control knob is operated a predetermined amount in the backward direction, the switch 3 is turned on. When the control knob is further operated in either the forward or backward directions after the respective switches 2 and 3 have been turned on, the automode switch 4 is also turned on.

Each of the switches 2 through 4 has two terminals one of which is electrically connected to a d.c. power terminal 5 through a diode 6 having the polarity illustrated in FIG. 1, and the other of which is electrically connected to each of terminals Ta, Tb, Tc of a control circuit 7 to be described later. Incidentally, although not shown, the terminal 5 is electrically connected to an automobile battery (whose output voltage is 12 V) through an ignition switch.

When a d.c. motor 8 used to drive a power window regulator is supplied with current in the forward direction (i.e., in the direction indicated by the arrow UP in FIG. 1), an unillustrated window glass for a door provided on the side of the driver's seat is moved in an upward direction (i.e., in the direction in which the window glass is closed). On the other hand, when the d.c. motor 8 is supplied with current in the reverse direction (i.e., in the direction indicated by the arrow DOWN in FIG. 1), the window glass is moved in the downward direction (i.e., in the direction in which the window glass is opened).

First and second relays 9 and 10 are put together to form a single unit. A common contact c of a relay switch 9a is electrically connected to one of the two terminals of the motor 8 whereas a common contact c of a relay switch 10a is electrically connected to the other thereof. In addition, these common contacts c are electrically connected to terminals Td and Te of the control circuit 7 through diodes 11a and 11b provided in the forward direction. Each of normally-open contacts a of the relay switches 9a and 10a is electrically connected to the d.c. power terminal 5, whereas each of normally-closed contacts b of the relay switches 9a and 10a is electrically connected to a ground terminal through a current detecting resistor 12, which constitutes a current detecting circuit for detecting current flowing into the motor 8. A relay coil 9b of the first relay 9 is electrically connected between the terminal Td and a terminal Tf of the control circuit 7, whereas a relay coil 10b of the second relay 10 is electrically connected between the terminal Te and a terminal Tg of the control circuit 7.

A cut-off voltage Vd having a level corresponding to a load current which flows into the motor 8 appears at one terminal of the current detecting resistor 12, which is provided on the relay 9 and 10 side thereof. The cut-off voltage Vd is applied to a terminal Th of the control circuit 7.

The control circuit 7 is made up of a hybrid-type IC, for example, and has terminals Ti and Tj as well as the above-described terminals Ta through Th. In this case, the terminal Ti is electrically connected to the ground terminal whereas the terminal Tj is electrically coupled to the ground terminal through a resister 13 used to generate a first reference voltage Vf to be described later.

The structure of the control circuit 7 will hereinafter be described specifically.

More specifically, a voltage-regulator diode 14 (whose zener voltage is about 9 V) is electrically connected, oriented with the polarity illustrated in FIG. 1, between a bus La and an auxiliary bus Lb. The bus La is electrically connected to each of the cathodes of diodes 16a and 16b through a resistor 15 used to protect the voltage-regulator diode 14, whereas the auxiliary bus Lb is electrically connected to the terminal Ti (i.e., the ground terminal). The anodes of the diodes 16a and 16b are electrically connected through resistors 17a and 17b, respectively, to the auxiliary bus Lb, and electrically connected to the terminals Td and Te, respectively.

The terminal Ta corresponding to the manually-operated window glass move-up switch 2 is electrically connected to the terminal Td through a diode 18a provided in the forward direction, and also electrically connected to the auxiliary bus Lb through resistors 19 and 20 electrically connected in series to each other. The terminal Tb associated with the manually-operated window glass move-down switch 3 is electrically connected to the terminal Te through a diode 18b provided in the forward direction, and also electrically coupled to the auxiliary bus Lb through resistors 21 and 22 connected in series to each other. The terminal Tc, which is associated with the automode switch 4, is electrically connected to the auxiliary bus Lb through a resistor 23, a diode 24 with the polarity illustrated in FIG. 1 and a capacitor 25 serving as a timer element, all of which are electrically connected in series to one another. Incidentally, since the capacitor 25 must have a relatively large capacity, an electrolytic capacitor, for example, is used as the capacitor 25.

A resistor 26 used to discharge an electric charge is electrically connected between the two terminals of the capacitor 25. The time constant for the discharge of the capacitor 25 through the resistor 26 is set to be 10 seconds or so, for example. Incidentally, the time constant for the discharge of the capacitor 25 through the resistor 23 and the diode 24 is set to be 0.01 seconds or so, for example.

On the other hand, an auxiliary reference voltage generating circuit 28 comprises a resistor 27 electrically connected in series between the bus La and the terminal Tj, and the resistor 13. An auxiliary reference voltage Vf is outputted from a common junction point where the resistors 13 and 27 ar electrically connected to each other.

Although not shown, a first comparing circuit 29 as a cut-off circuit is supplied with current through the bus La and the auxiliary bus Lb. A window glass automatic stopping circuit, which is already known in the power window regulator field, comprises the first comparing circuit 29, the current detecting resistor 12, and the auxiliary reference voltage generating circuit 28, or the like. In this case, the first comparing circuit 29 is electrically connected within the control circuit 7 in such a manner that the auxiliary reference voltage Vf supplied through a resistor 30 is compared with the cut off voltage Vd supplied through a resistor 31 from the terminal Th. The first comparing circuit 29 is of an open collector output type. When Vf>Vd, the first comparing circuit 29 is in an off state (i.e., in a state in which an internal transistor provided at an output stage of the control circuit 7 is turned off) with its output resistance increased. On the other hand, when Vf≦Vd, the first comparing circuit 29 is in an on state (i.e., in a state in which the transistor provided at the output stage is turned on) with its output resistance decreased The output terminal of the first comparing circuit 29 is electrically connected to the cathodes of both of the diodes 29a and 29b. On the other hand, the anode of the diode 29a is electrically connected to the positive terminal of the capacitor 25 through resistors 32 and 33 electrically connected in series to each other. In this case, a voltage-regulator diode 34 serving as a clamping circuit is electrically connected in parallel with the resistor 33, oriented with the polarity illustrated in FIG. 1. As a result of the electrical connections described above, current discharged from the capacitor 25 flows into the resistors 32 and 33 when the first comparing circuit 29 is turned on (at this time, the current discharged from the capacitor 25, which is negligibly small, also flows through the resistor 26). The time $\tau_0$, which makes it necessary to reduce a voltage of a point P (a common junction point between the resistors 32 and 33) in FIG. 1, i.e., a detection voltage Vp, from the starting point of its discharge up to the level of a reference voltage Vs', is set to about 0.7 second.

In this case, the ratio of the resistance between the resistors 32 and 33 is set to 1:100 or so, for example. Thus, the above time $\tau_0$ is substantially determined by the resistor 33. Therefore, when the discharge of the capacitor 25 through the resistors 32 and 33 is initiated, the detection voltage Vp at the point P is clamped to a zener voltage Vzd of the diode 34, and thereafter gradually reduced from the voltage Vzd.

A reference voltage generating circuit 37 comprising a series circuit of resistors 35 and 36 is electrically connected between the bus La and the auxiliary bus Lb. A reference voltage Vs determined by obtaining a voltage by means of voltage-dividing the supply voltage with the resistors 35 and 36 is outputted from a common junction point between the resistors 35 and 36. In this case, the reference voltage Vs is set to be a voltage higher than the zener voltage Vzd of the diode 34.

A voltage varying circuit 38 comprises a resistor and the diode 29b. One of the terminals of the resistor 39 is electrically connected to the common junction point between the resistors 35 and 36, whereas the other thereof is electrically coupled to the output terminal of the first comparing circuit 29 through the diode 29b. Thus, when the first comparing circuit 29 is in the on state, the resistors 36 and 39 are electrically connected in parallel with each other, so that the reference voltage Vs is reduced to the voltage Vs'. Incidentally, the thus-processed reference voltage Vs' is set to be a voltage lower than the zener voltage Vzd of the diode 34.

Although not shown, a second comparing circuit 40 serving as a holding circuit is supplied with current through the bus La and the auxiliary bus Lb. The second comparing circuit 40 is provided in the control circuit 7 so as to compare the reference voltage Vs and the detection voltage Vp. In this case, the second comparing circuit 40 is also of an open collector output type similarly to the first comparing circuit 29. When Vs<Vp, the second comparing circuit 40 is in an off state with its output resistance increased. On the other hand, when Vs≧Vp, the second comparing circuit is turned to an on state from the off state with its output resistance decreased.

At this time, a series circuit comprising a diode 1 with the polarity illustrated in FIG. 1 and a resistor 42 is electrically connected between the output terminal of the second comparing circuit 40 and the cathode of the diode 24. A positive clamping diode 43 with the polarity illustrated in FIG. 1 is electrically connected between the anode of the diode 24 and the bus La. Further, a resistor 44 is electrically connected between the output terminal of the second comparing circuit 40 and the bus La. Incidentally, when the second comparing circuit 40 is turned from the off state to the on state at the time the capacitor 25 is in its charged state, the electric charge stored in the capacitor 25 is discharged through the resistor 42 and the diode 41. At this time, the time constant at the time of its discharge is set to about 0.1 second.

The collector and the emitted of an npn transistor 45 are electrically connected to the terminal Tf and the auxiliary bus Lb, respectively. The base of the npn transistor 45 is electrically connected to a common junction point between the resistors 19 and 20 and also connected to the terminal Td through a series circuit comprising a diode 46 with the polarity illustrated in FIG. 1 and a resistor 47. At this time, the anode of the diode 46 is electrically connected to the output terminal of the second comparing circuit 40 via a diode 48 with the illustrated polarity. Further, a diode 49 with the illustrated polarity is electrically connected between the collector of the npn transistor 45 and the terminal Td.

An npn transistor 50 serving as a second semiconductor switching device has a collector and an emitter which are electrically connected to the terminal Tg and the auxiliary bus Lb, respectively. The base of the npn transistor 50 is electrically connected to a common junction point between the resistors 21 and 22, and also electrically connected to the terminal Te through a series circuit comprising a diode 51 with the illustrated polarity and a resistor 52. At this time, the anode of the diode 51 is electrically connected to the output terminal of the second comparing circuit 40 through a diode 53 with the illustrated polarity. Further, a diode 54 with the illustrated polarity is electrically connected between the collector of the transistor 50 and the terminal Te.

An auxiliary voltage varying circuit 55 provided in association with the reference voltage generating circuit 37 is constructed as follows. More specifically, a capacitor 56 is electrically connected in parallel with the resistor 35 in the reference voltage generating circuit 37. A series circuit comprising a resistor 57 and a diode 58 with the illustrated polarity is electrically connected in parallel with the capacitor 56. Further, diodes 59a and 59b with the illustrated polarities, which constitute an AND circuit, are respectively electrically connected between a common junction point Q (between the resistor 57 and the diode 58) and the terminal Td, and between the common junction point Q therebetween and the terminal Te.

Figure 2:
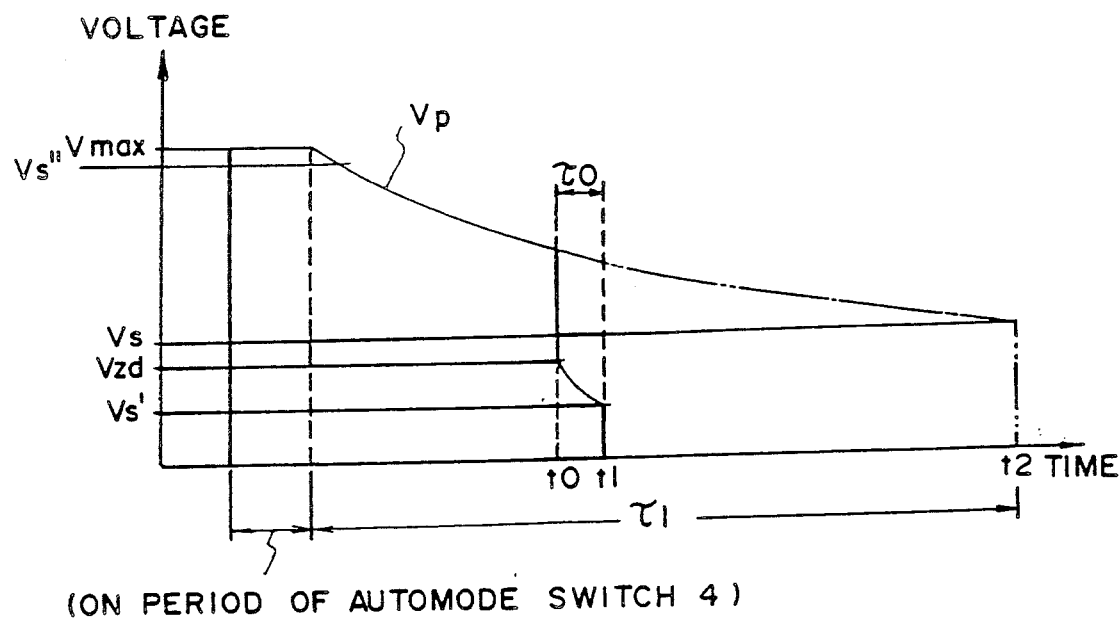
FIG. 2 is a characteristic diagram showing an electric discharge of a capacitor used to describe the operation of the first embodiment.

The operation of the first embodiment constructed as described above will now be described below with reference to FIGS. 1 and 2.

(a) When it is desired to move the window glass upward and downward in a manual mode:

When it is desired to move the window glass upward, the manually-operated window glass move-up switch is turned on. As a consequence, base current is supplied to the transistor 45 from the d.c. power terminal through the diode 6, the switch 2 and the resistor 9, thereby turning on the transistor 45. At the same time, the current flowing through the diode 6, the switch 2, the diode 18a and the transistor 45 enables the relay coil 9b of the first relay 9 to be energized, so that the first relay 9 is actuated so as to connect the two contacts (c and a) of the relay switch 9a, i.e., make these two contacts of the relay switch 9a connect.

As a result, an electrical path for causing current in the direction indicated by the arrow UP, i.e., in the forward direction, to flow in the motor 8 is formed, so as to move the window glass upwardly. When the switch 2 is turned off at the time that the window glass is elevated, the transistor 45 is turned off to de-energize the relay coil 9b. Therefore, the relay switch 9a is reset to make the two contacts (c and b) thereof connect, so that the above electrical path of the motor 8 is cut off. Accordingly, the window glass is stopped from being moved upwardly, correspondingly.

When it is desired to move the window glass downward, the manually-operated window glass move-down switch 3 is turned on. As a consequence, the relay coil 10b of the second relay 10 is energized in response to the turning on of the transistor 50 so as to activate the second relay 10, thereby enabling the two contacts (c and a) of the relay switch 10a to make contact. Therefore, an electrical path for causing current in the direction indicated by the arrow DOWN, i.e., in the reverse direction to flow in the motor 8 is formed, so as to move the window glass downward. When the switch 3 is turned off at the time the window glass is moved downward, the transistor 50 is turned off. As a consequence, the relay switch 10a is reset to enable the two contacts (c and b) to make contact, thereby cutting off the electrical path of the motor 8. Thus, the window glass is stopped from being lowered.

Incidentally, the resistor 47 is electrically connected to the d.c. power terminal 5 through the diode 11a and the two contacts (c and a) of the relay switch 9a when the transistor 45 is in the on state as described above. In addition, the resistor 52 is electrically connected to the d.c. power terminal 5 through the diode 11b and the two contacts (c and a) of the relay switch 10a when the transistor 50 is in the on state. However, since the second comparing circuit 40 is in the on state at this time, the currents which flow in the resistors 47 and 52, are delivered through the diodes 48 and 53, respectively, to the output terminal of the second comparing circuit 40. Thus, the base current is not supplied to the transistors 45 and 50 through their corresponding resistors 47 and 52, and the transistors 45 and 50 are reliably turned off in response to the turning off of each of the switches 2 and 3.

(b) When it is desired to move the window glass upward in the auto mode:

When the automode switch 4 is turned on after the switch 2 is turned on, an electrical path for energization of the relay coil 9b and an electrical path for causing the current in the forward direction to flow in the motor 8 are defined by turning on the transistor 45 and making the two contacts (c and a) of the relay switch 9a conductive as described in the above part (a). The movement of the window glass in the upward direction is correspondingly initiated. Under this condition, the d.c. power terminal 5 and the auxiliary bus Lb electrically connected to the ground terminal are coupled to each other through the two contacts (c and a), the diodes 11a, 16a, the resistor 15, the bus La and the diode 14. Therefore, a d.c. constant-voltage output is supplied between the bus La and the auxiliary bus Lb so as to maintain the voltage applied to the control circuit 7 at a constant level.

However, the first comparing circuit 29 is in the off state (as can be understood from the following description) upon turning on the automode switch 4. Therefore, the capacitor 25 is charged immediately through the resistor 23 and the diode 24 (the time required to charge the capacitor 25 is 0.01 second or so). As a consequence, as shown in FIG. 2, the detection voltage Vp at the point P increases immediately up to the maximum voltage Vmax (corresponding to a voltage obtained by dividing the supply voltage with the resistors 23 and 26). As a result, the detection voltage Vp becomes greater than the reference voltage Vs from the reference voltage generating circuit 37, and hence the second comparing circuit 40 is changed from the on state to the off state. Under this condition, the diode 48 is reverse-biased, and hence the transistor 45 is supplied with the base current from the d.c. power terminal 5 through the two contacts (c and a) of the relay switch 9a, the diode 11a, the resistor 47 and the diode 46, so that the transistor 45 is held on.

When the second comparing circuit 40 is activated to hold the transistor 45 on, as described above, the electrical path for energization of the relay coil 9b is formed by the two contacts (c and a), the diode 11a, and the transistor 45. Thus, even when the switches 4 and 2 are turned off after formation of its electrical path, the electrical path for causing the current in the forward direction to flow in the motor 8 is continuously established, so that the window glass is automatically moved upward.

When the window glass is automatically elevated and reaches the maximum elevated position (where the window glass is fully closed) as described above, the motor 8 is de-activated or locked to cause a relatively large lock current to flow therein. Thus, the voltage drop across the current detecting resistor 12 is increased correspondingly. When the cut-off voltage Vd applied to the terminal Th becomes greater than the auxiliary reference voltage Vf from the auxiliary reference voltage generating circuit 28 with an increase in such a voltage drop, the first comparing circuit 29 is changed from the off state to the on state.

As a consequence, the electric charge stored in the capacitor 25 is forcibly discharged through the resistors 32 and 33, the diode 29a and the output terminal of the first comparing circuit 29. However, the detection voltage Vp at the point P is clamped to the zener diode Vzd of the diode 34 at the time the discharge of the capacitor 25 is initiated at a time $t_0$, as indicated in FIG. 2. Thus, the detection voltage Vp is gradually reduced from the clamped voltage Vzd at a rate in proportion to the resistance values of the resistors 32 and 33. At the same time, the voltage varying circuit 38 is activated to decrease the reference voltage Vs to Vs' (Vs'<Vzd). Thus, when the detection voltage Vp reaches a point lower than the reference voltage Vs' (at a time $t_1$ as indicated in FIG. 2) over a period of time $\tau_0$ (about 0.7 second) which elapses after the discharge of the capacitor 25 is initiated, the second comparing circuit 40 is turned on.

Thus, the base current supplied to the transistor 45 through the resistor 47, the diode 46 or the like is delivered to the output terminal of the second comparing circuit 40 through the diode 48, so that the transistor 45 is turned off. As a result, the relay coil 9b is de-energized so that the relay switch 9a is reset to make the two contacts (c and b) connect. Thus, the electrical path for causing the current in the forward direction to flow in the motor 8 is cut off and hence the window glass is stopped in the position of maximum elevation. Incidentally, so-called tightening of the window glass is performed during the time $\tau_0$ as a result of the electric charge stored in the capacitor 25 being discharged during the elapse of the time $\tau_0$ as described above.

When the lock current flows in the motor 8, it may be reduced by an increase in temperature of windings used for the motor 8. Thus, when the motor 8 is driven under the auto mode as described above, the cut-off voltage Vd does not exceed the auxiliary reference voltage Vf for any length of time in some cases. In this case, the energization of the motor 8 continues, causing undesirable consequences such as damage to the motor.

Under this condition, the electric charge stored in the capacitor 25 is discharged through the resistor 26 after the automode switch 4 is turned off. Therefore, the detection voltage Vp at the point P is gradually reduced as indicated by the two-dot chained line in FIG. 2 (the time constant of a discharge circuit comprising the capacitor 25 and the resistor 26 is about 10 seconds). When the time $\tau_1$ corresponding to the above time constant elapses and the detection voltage Vp becomes lower than the reference voltage Vs (as indicated at a time $t_2$ in FIG. 2), the second comparing circuit 40 is changed from the off state to the on state.

As a result, the supply of the base current to the transistor 45 through the resistor 47 and the diode 46 is stopped, thereby turning off the transistor 45. Therefore, the relay coil 9b is de-energized to reset the relay switch 9a so as to make the two contacts (c and b) connect. As a consequence, the motor 8 is deenergized. More specifically, when a predetermined period of time $\tau_1$ elapses from the time at which the motor 8 is turned on in the auto mode, the motor 8 is automatically de-energized. It is therefore possible to prevent the above-described undesired accident from occurring.

Incidentally, when the second comparing circuit 40 is turned on, as described above, and as the electric charge stored in the capacitor 25 is discharged through the resistor 26 or the resistors 32 and 33, its electric charge is discharged in a short period of time (0.1 second or so) through the resistor 42 and the diode 41. Thus, any chattering of the second comparing circuit 40 can reliably be prevented from occurring.

(c) When it is desired to move the window glass downward in the auto mode:

When the manually-operated window glass move-down switch 3 is turned on and thereafter the automode switch 4 is also turned on, an electrical path for energization of the relay coil 10b and an electrical path for causing the current in the reverse direction to flow in the motor 8 are formed by turning on the transistor 50 and making the two contacts (c and a) of the relay switch 10a conductive (as described in part (a) above). Then, the movement of the window glass in the downward direction is initiated and a voltage supplied to the control circuit 7 is maintained at a constant level.

At this time, the capacitor 25 is charged immediately and the second comparing circuit 40 is changed from the on state to the off state, in the same manner as described in part (b) above. Therefore, the diode 53 is reverse-biased, and hence the transistor 50 is supplied correspondingly with the base current from the d.c. power terminal 5 through the circuit formed by the two contacts (c and a) of the relay switch 10a, the diode 11b, the resistor 52 and the diode 51. As a consequence, the transistor 50 is held on by the second comparing circuit 40.

Thus, the electrical path for energization of the relay coil 10b is formed by the two contacts (c and a) of the relay switch 10a, the diode 11b and the transistor 50. Even when the switches 4 and 3 are subsequently turned off, the above-described reverse-direction electrical path of the motor 8 is continuously established, thereby enabling the automatic lowering of the window glass.

When the window glass reaches the lowest position (where the window glass is fully opened), the motor 8 is de-activated or locked to cause a relatively large lock current flow therein. Therefore, the first comparing circuit 29 is changed from the off state to the on state in a similar way as is described in part (b) above, and thereafter the second comparing circuit 40 is also changed to the on state during the elapse of time $\tau_0$.

Accordingly, the base current supplied to the transistor 50 through the resistor 52, the diode 51 or the like is delivered to the output terminal of the second comparing circuit 40 through the diode 53, so that the transistor 50 is turned off. Consequently, the relay coil 10b is de-energized to reset the relay switch 10a so as to make the two contacts (c and b) connect. Thus, the above reverse-direction electrical path of the motor 8 is cut off so that the window glass is stopped in the lowest position.

Incidentally, the description of other operations will be omitted because they are identical to those in part (b) above.

(d) When it is desired to stop the movement of the window glass in the upward direction in a state in which the window glass is being moved upward in the auto mode:

When the window glass is being elevated in the auto mode, the capacitor 25 is in a charged state as is clearly understood from the above description, and the transistor 45 is held on correspondingly. When the manually-operated window glass move-down switch 3 is turned on only for a short period of time under this condition, the transistor 50 is turned on in response, thereby energizing the relay coil 10b, thereby making the two contacts (c and a) of the relay switch 10a connect. Thus, both terminals of the motor 8 are shortcircuited through the respective two contacts (c and a) of the relay switches 9a and 10a, so that the motor 8 is de-energized at once to stop rotating.

When the switch 3 is turned on as described above, i.e., when the first and second relays 9 and 10 are both actuated, the respective cathodes of the diodes 59a and 59b are simultaneously raised to the level of the supply voltage in the auxiliary voltage varying circuit 55 and then reverse-biased. Therefore, the voltage at a point Q in FIG. 1, which has been so far set to the level of the ground potential, is also raised to the supply voltage level. As a consequence, the resistor 57 is electrically connected in parallel with the resistor 35 of the reference voltage generating circuit 37, and the sum of the resistance values of the resistors 35 and 57 is reduced. Therefore, the output of the reference voltage generating circuit 37 is varied to reach a reference voltage Vs'' (see FIG. 2) near the maximum voltage Vmax. Thus, the detection voltage Vp becomes smaller than a second reference voltage Vs'', and hence the second comparing circuit 40 is changed to the on state from the off state, thereby turning off the transistor 45. At the same time, the electric charge stored in the capacitor 25 is rapidly discharged through the resistor 42 and the diode 41.

As a result, the relay coil 9b is de-energized, thereby resetting the relay switch 9a so as to make the two contacts (c and b) connect. When the switch 3 is turned off after it is turned on only for the short period of time as described above, the relay coil 10b is de-energized, thereby resetting the relay switch 10a so as to connect the two contacts (c and b). As a consequence, the motor 8 is de-energized so as to return to the initial condition.

Incidentally, the de-actuation of both of the relays 9 and 10 is performed before the turning on of the switch 3 is released, i.e., in a state in which the voltage supplied to the control circuit 7 is held constant through the switch 3. Thus, the voltage at the point Q is reduced to the original potential level immediately after the respective relays 9 and 10 are deactuated, and hence the output of the reference voltage generating circuit 37 is reset to the reference voltage Vs in response to the reduction in the voltage at the point Q. However, the resetting of the output from the reference voltage generating circuit 37 to the reference voltage Vs is delayed by a period during which the current for charging the capacitor 56 flows in the capacitor 56. Consequently, the second comparing circuit 40 is prevented from malfunctioning.

(e) When it is desired to stop the window glass from being moved in the downward direction while it is being moved downward in the auto mode:

While the window glass is being moved downward in the auto mode, the capacitor 25 is in a charged state, and the transistor 50 is turned on correspondingly. When the manually-operated window glass move-up switch 2 is turned on only for a short period of time under this condition, the motor 8 is immediately deactivated and the electric charge stored in the capacitor 25 is rapidly discharged through the resistor 42 and the diode 41 as in the description in part (d) above. When the switch 2 is thereafter turned off, the motor 8 is de-energized so as to be placed in the initial state.

According to the arrangement of the present embodiment, when an auto-stop function (which detects the lock current flowing in the motor 8 so as to stop the window glass from being moved upward and downward) for stopping the movement of the window glass in the upward or downward direction under the auto mode is impaired, the movement of the window glass upward or downward can be stopped by the function of a timer comprising the capacitor 25 and the resistor 26, after a predetermined period of time elapses. Accordingly, it is unlikely that the motor 8 will be carelessly energized for a long period of time while it is in its locked state. In addition, a tendency for the motor 8 to overheat and for a battery installed in the automobile to be excessively consumed can be avoided.

The tightening time $\tau_0$ beginning at the time that the window glass reaches a position where it is fully closed or opened corresponds to the time required for the detection voltage Vp to be gradually reduced in response to the discharge of the electric charge of the capacitor 25, the difference in potential or voltage between the zener voltage Vzd and the reference voltage Vs' varying by a constant amount. Thus, this time $\tau_0$ indicates a constant period of time at all times. Therefore, the duration of the tightening time of the window glass is no longer subjected to variations as in the conventional example.

Since the reference voltage Vs' referred to above is set to a voltage lower than the normally-used reference voltage Vs, the clamping voltage of the diode 34 (i.e., the zener voltage Vzd of the diode 34) can be set to a lower voltage level. As a result, the detection voltage Vp can be clamped to the constant voltage Vzd which is lower than the detection voltage Vp even when the time required for the window glass to reach the position where it is fully closed or opened is excessively prolonged, i.e., even when the detection voltage Vp is reduced much more greatly than expected, thereby making it possible to reliably make the tightening time $\tau_0$ of the window glass constant.

Further, according to the arrangement of the present embodiment, the transistor 45 is electrically connected to the d.c. power terminal 5 through the switch 2, whereas the transistor 50 is electrically connected to the d.c. power terminal 5 through the switch 3. Therefore, the supply voltage from the d.c. power terminal 5 is not applied to either of the transistors 45 and 50 when both of the switches 2 and 3 are in the off state, i.e., in a steady state. It is therefore very unlikely that the transistors 45 and 5 will malfunction due to noise. In addition, the reliability of relay control executed by the control circuit 7 is improved.

Incidentally, for example, a voltage varying circuit may be provided as needed in the present invention.

Figure 3:
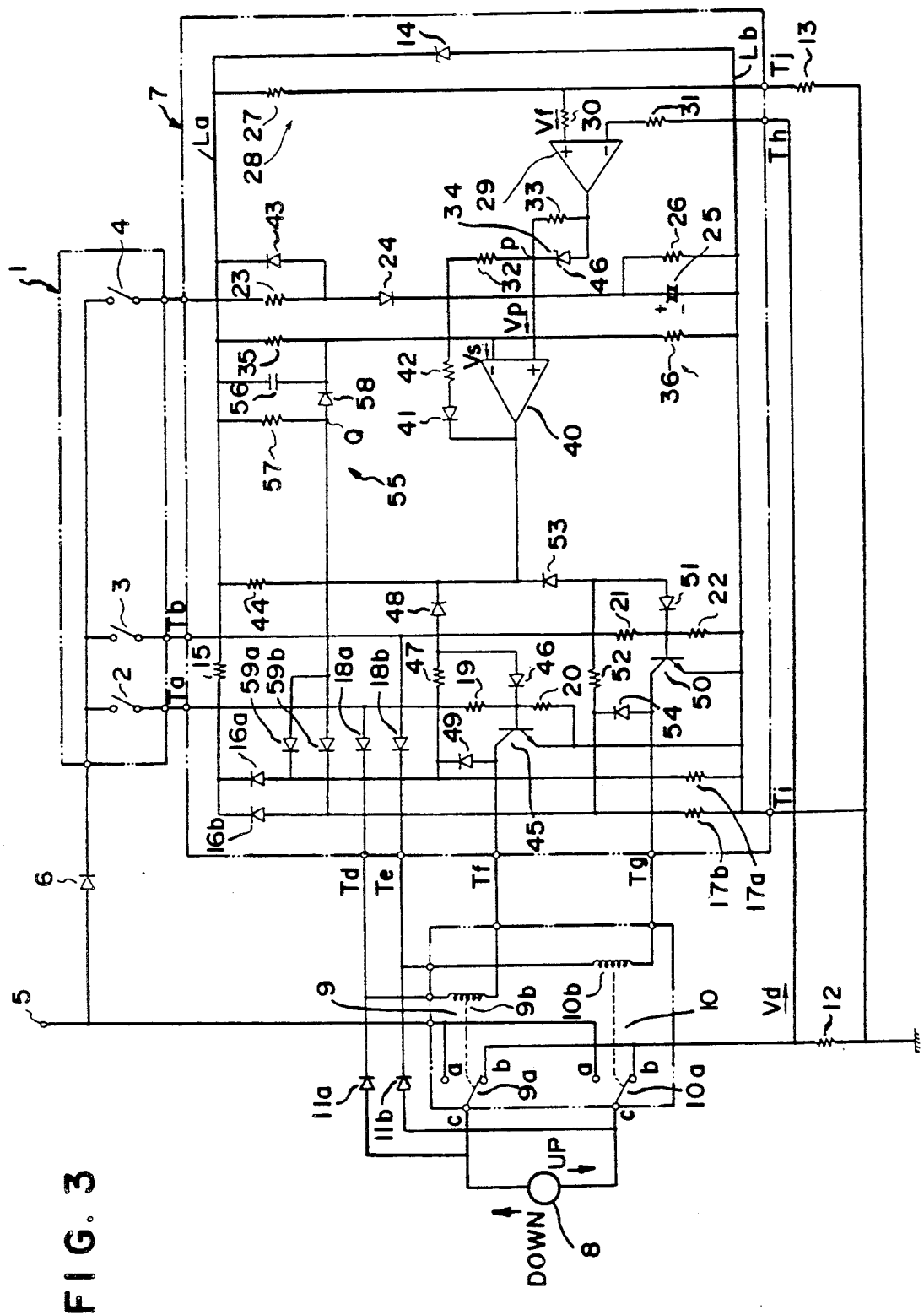
FIG. 3 is a circuit diagram depicting a modification of the first embodiment.

FIG. 3 shows a modification exclusive of the voltage varying circuit. As shown in the same drawing, the modification does not include the diodes 29a and 29b provided in parallel with the output terminal of the first comparing circuit 29, and the resistor 39 electrically connected in series to the diode 29b. Other elements of structure employed in the present modification are identical to those used in the first embodiment. Thus, the same elements of structure as those employed in the first embodiment in the drawing are identified by like reference numerals and the description of the common elements will therefore be omitted.

Figure 4:
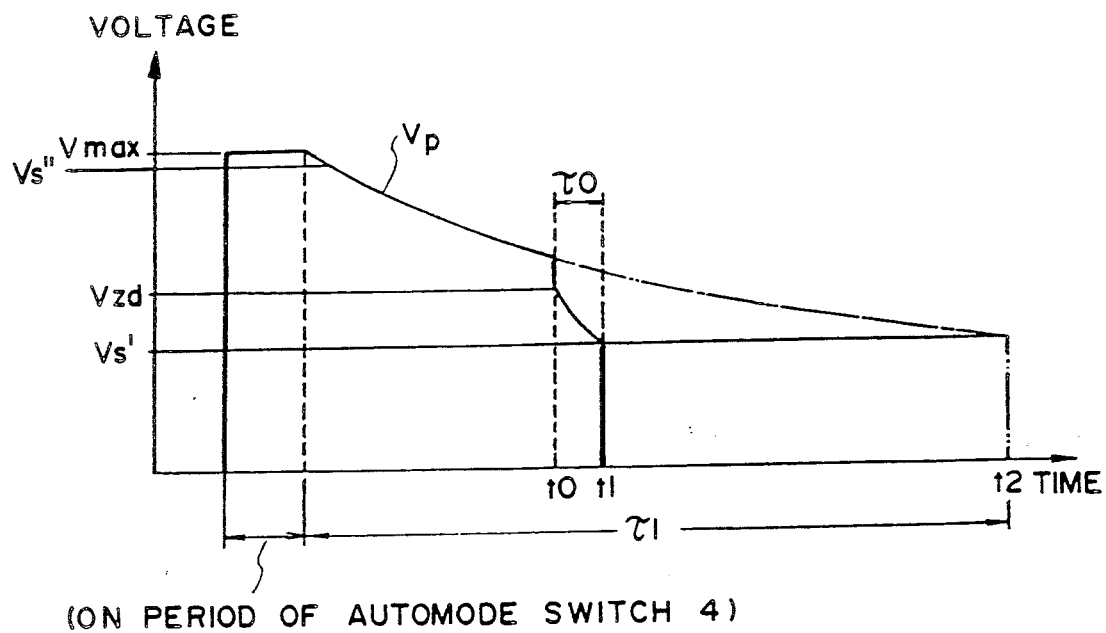
FIG. 4 is a characteristic diagram illustrating an electric discharge of a capacitor used to describe the operation of the modification.

In the present modification, when an electric charge stored in a capacitor 25 is discharged through resistors 32 and 33 and a output terminal of the first comparing circuit 29 as illustrated in FIG. 4, a detection voltage Vp, which appears at point P, is reduced from a clamping voltage Vzd of a voltage-regulator diode 34 at a rate in proportion to the resistance values of resistors 32 and 33, at a time $t_0$ as indicated in FIG. 4 upon initiation of the discharge of the electric charge in the capacitor 25. When the time $\tau_0$ (0.7 second or so) has elapsed after the discharge of the electric charge in the capacitor 25 is initiated, and the detection voltage Vp becomes smaller than a reference voltage Vs (at a time $t_1$ as indicated in FIG. 4), a second comparing circuit 38 is changed from an off state to an on state.

Since other operations of the present modification are identical to those in the first embodiment, the description of the operations will be omitted.

According to the present embodiment, as has clearly been understood from the above description, there is provided a control apparatus for use in a power window regulator, wherein the movement of the window glass in the upward and downward directions under the auto mode is continuously performed during a period in which the detection voltage corresponding to the voltage applied across the capacitor serving as a timer component exceeds a reference voltage, this control apparatus comprising a cut-off circuit for discharging the electric charge stored in the capacitor in accordance with a predetermined time constant when the window glass is moved to a position where it is fully closed or opened in the auto mode, and the clamping circuit for clamping a detection voltage corresponding to the voltage across the capacitor to a constant voltage higher than the reference voltage when the discharge of the electric charge in the capacitor is initiated by the cut-off circuit. Therefore, the control apparatus can bring about a superb effect in that the time required to reduce the detection voltage to the reference voltage or below, i.e., the time for tightening the window glass after the window glass reaches the position where it is fully closed or opened, can be stabilized so as to be the same at all times.

According to this modification, there is provided a voltage varying circuit for reducing the reference voltage to a desired voltage when the discharge of the electric charge in the capacitor is initiated by the cut-off circuit. Therefore, the tightening time of the window glass can be stabilized even when the time required for the window glass to reach the position where it is fully closed or opened in the auto mode is excessively prolonged.

A second embodiment according to the present invention applied to a power window regulator provided on the side of a driver's seat of an automobile will hereinafter be described with reference to the accompanying drawings.

Figure 5:
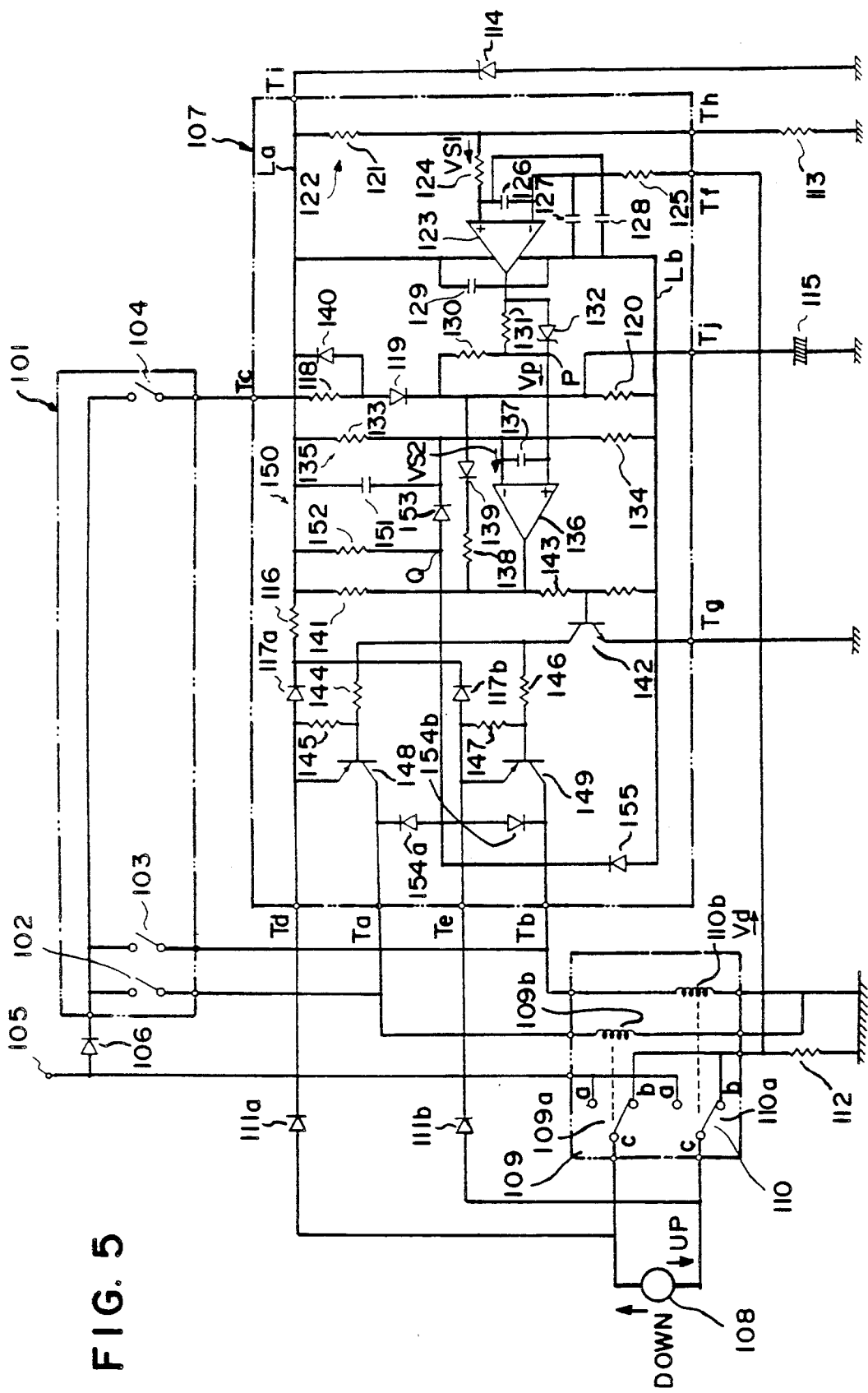
FIG. 5 is a circuit diagram showing a second embodiment of the present invention.

Referring to FIG. 5, a power window switch 101 provided so as to be operable from the automobile driver's seat comprises a manually-operated window glass move-up switch 102 as a first manually-operated mode switch, a manually-operated window glass move-down switch 103 as a second manually-operated mode switch, and an automode switch 104 as well as a control knob (not shown) operable in the forward and backward directions, for example, from the neutral position of the switch 101. Each of these switches 102 through 104 can be automatically reset, and is normally held off when the control knob is set in the neutral position, i.e., it is in a non-operated state. When the control knob is operated a predetermined amount in the forward direction from the non-operated state of the control knob, the switch 102 is turned on. On the other hand, when the control knob is operated a predetermined amount in the backward direction, the switch 103 is turned on. When the control knob is further operated in the forward or backward directions after the respective switches 102 and 103 have been turned on, the automode switch 104 is also turned on.

Each of the switches 102 through 104 has two terminals one of which is electrically connected to a d.c. power terminal 105 through a diode 106 having the polarity illustrated in FIG. 5, and the other of which is electrically connected to each of terminals Ta, Tb, Tc of a control circuit 107 to be described later. Incidentally, although not shown, the terminal 105 is electrically connected to an automobile battery (whose output voltage is 12 V) through an ignition switch.

When a d.c. motor 108 used to drive a power window regulator is supplied with current in the forward direction (i.e., in the direction indicated by the arrow UP in the drawing), an unillustrated window glass for an automobile door provided on the driver's seat side of an automobile is moved in an upward direction (i.e., in the direction in which the window glass is closed). On the other hand, when the d.c. motor 108 is supplied with current in the reverse direction (i.e., in the direction indicated by the arrow DOWN in the drawing), the window glass is moved in the downward direction (i.e., in the direction in which the window glass is opened).

First and second relays 109 and 110 are united into a single unit. A common contact c of a relay switch 109a is electrically connected to one of two terminals of the motor 108, whereas a common contact c of a relay switch 110a is electrically connected to the other thereof. In addition, these common contacts c are respectively electrically connected to terminals Td and Te of the control circuit 107 through diodes 111a and 111b provided in the forward direction. Each of the normally-open contacts a of the relay switches 109a and 110a is electrically connected to the d.c. power terminal 105, whereas each of normally-closed contacts b of the relay switches 109a and 110a is electrically connected to a ground terminal through a current detecting resistor 112 for detecting current flowing into the motor 108. A relay coil 109b of the first relay 109 is electrically connected, for its energization, to the d.c. power terminal 105 through the diode 106 and the switch 102, whereas a relay coil 110b of the second relay 110 is electrically connected, for its energization, to the d.c. power terminal 105 through the diode 106 and the switch 103.

A cut-off voltage Vd having a level corresponding to a load current which flows into the motor 108 appears at a terminal of the current detecting resistor 112, which is provided on the relay 109, 110 side thereof. The cut-off voltage Vd is applied to a terminal Tf of the control circuit 107.

The control circuit 107 is comprised of a hybrid-type IC, for example, and has terminals Tg and Tj as well as the above-described terminals Ta through Tf. In this case, the terminal Tg is electrically connected to the ground terminal whereas the terminal Th is electrically coupled to the ground terminal through a resister 113 used to generate a first reference voltage $Vs_1$ to be described later. In addition, the terminal Ti is electrically connected to the ground terminal through a voltage-regulator diode 114 (whose zener voltage is 8 V or so) with the polarity illustrated in FIG. 5, whereas the terminal Tj is electrically connected to the ground terminal through a capacitor 115 connected in series to the terminal Tj and serving as a component for a timer. Incidentally, since the capacitor 115 must have a relatively large capacity, an electrolytic capacitor, for example, is used as the capacitor 115.

The structure of the control circuit 10 will hereinafter be described more specifically.

A bus La has one end electrically connected to the terminal Td through a resistor 116 and a diode 117a with the illustrated polarity, and to the terminal Te through the resistor 116 and a diode 117b with the illustrated polarity, and has the other end electrically connected to the terminal Ti. An auxiliary bus Lb is electrically connected to the terminal Tg (i.e., ground terminal).

The terminal Tc, which is coupled to the automode switch 104, is electrically connected to the auxiliary bus Lb through a resistor 118, a diode 119 with the polarity illustrated in FIG. 5 and a discharge capacitor 120. The terminal Tj to which the capacitor 115 is connected is electrically connected to a common junction point between the diode 119 and the resistor 115. In this case, the time constant for the discharge of the capacitor 115 through the resistor 120 is set to 10 seconds or so, for example. Incidentally, the time constant for the discharge of the capacitor 115 through the resistor 118 and the diode 119 is set to 0.01 second or so, for example.

On the other hand, an auxiliary reference voltage generating circuit 122 comprises a resistor 121 electrically connected in series between the bus La and the terminal Th, and the resistor 113. An auxiliary reference voltage $V_{s1}$ is outputted from a common junction point where the resistors 113 and 121 are electrically connected to each other.

A first comparing circuit 123 is supplied with current through the bus La and the auxiliary bus Lb. A window glass automatic stopping circuit, which is already known in the power window regulator field, comprises the first comparing circuit 123, the current detecting resistor 112, the auxiliary reference voltage generating circuit 122 or the like. In this case, the first comparing circuit 12 is electrically connected in the control circuit 107 in such a manner that the auxiliary reference voltage $V_{s1}$ supplied through a resistor 124 is compared with the cut-off voltage Vd supplied through a resistor 125 from the terminal Tf. The first comparing circuit 123 is of an open collector output type. When $V_{s1} > V_d$, the first comparing circuit 123 is in an off state (i.e., in a state in which an internal transistor provided at an output stage of the control circuit 107 is turned off) with its output resistance increased. On the other hand, when $V_{s1} \leq V_d$, the first comparing circuit 123 is turned to an on state (i.e., a state in which the transistor provided at the output stage is turned on) with its output resistance decreased. Incidentally, the first comparing circuit 123 is provided with noise-preventing capacitors 126 through 129, which are electrically connected between respective input and output terminals and between power terminals, respectively.

The output terminal of the first comparing circuit 123 is electrically connected to the terminal Tj through resistors 130 and 131 connected in series to each other. At this time, a voltage-regulator diode 132 (whose zener voltage $V_{zd} = 5$ to 6 V) for the voltage clamping is electrically connected with the polarity illustrated in FIG. 5 in parallel with the resistor 131. As a result of these electrical connections, current discharged from the capacitor 115 flows into the resistors 130 and 131 when the first comparing circuit 123 is turned on (at this time, the current discharged from the capacitor 115, which is negligibly small, also flows through the resistor 120). The time $\tau_0$ required for reducing a voltage of a point P (a common junction point between the resistors 130 and 131) in FIG. 5, i.e., a detection voltage Vp, from the starting point of its discharge up to the level of a reference voltage $V_{s2}$, is set to 0.7 second or so.

In this case, the ratio between the resistances of the resistors 130 and 131 is set to 1:400 or so, for example. Thus, the above time $\tau_0$ is substantially determined by the resistor 131. Therefore, when the discharge of the capacitor 115 through the resistors 130 and 131 is initiated, the detection voltage Vp at the point P is clamped to a zener voltage Vzd of the diode 132, and thereafter gradually reduced from the voltage Vzd thus clamped.

A reference voltage generating circuit 135 comprising a series circuit of resistors 133 and 134 is electrically connected between the bus La and the auxiliary bus Lb. The reference voltage $V_{s2}$ is output from a common junction point where the resistors 133 and 134 are electrically connected to each other. In this case, the reference voltage $V_{s2}$ is set to a voltage lower than the zene voltage Vzd of the diode 132.

Although not illustrated, a second comparing circuit 136 serving as a holding circuit is supplied with current through the bus La and the auxiliary bus Lb. The second comparing circuit 136 is provided in the control circuit 107 so as to compare the reference voltage $V_{s2}$ and the detection voltage Vp from the point P. In this case, the second comparing circuit 136 is also of an open collector output type similarly to the first comparing circuit 123. When $V_{s2} < V_p$, the second comparing circuit 136 is in an off state with its output resistance increased. On the other hand, when $V_{s2} \geq V_p$, the second comparing circuit 136 is turned to an on state from the off state with its output resistance decreased. Incidentally, a noise-preventing capacitor 137 is electrically connected between respective input terminals of the second comparing circuit 136.

At this time, a series circuit comprising a resistor 138 and a diode 139 having the polarity illustrated in FIG. 5 is electrically connected between the output terminal of the second comparing circuit 136 and the terminal Tj. A positive clamping diode 140 with the illustrated polarity is electrically connected between the anode of the diode 119 and the bus La. Incidentally, when the second comparing circuit 136 is turned from the off state to the on state at the time the capacitor 115 is in its charged state, the electric charge stored in the capacitor 115 is discharged through the diode 139 and the resistor 138. At this time, the time constant of the capacitor 115 at the time of its discharge is set to 0.1 second or so.

The output terminal of the second comparing circuit 136 is electrically connected to the bus La via a resistor 141, and to the base of an npn transistor 142 through a resistor 143. The collector of the npn transistor 142 is electrically connected to the terminal Td through resistors 144 and 145, and to the terminal Te through resistors 146 and 147. The emitter of the npn transistor 142 is electrically connected to the auxiliary bus Lb.

A pnp transistor 148 serving as a first semiconductor switching device has an emitter and a collector which are electrically connected to the terminals Td and Ta, respectively. The base of the pnp transistor 148 is electrically coupled to a common junction point where the resistors 144 and 145 are electrically connected to each other.

A pnp transistor 149 serving as a second semiconductor switching device has an emitter and a collector which are electrically connected to the terminals Td and Ta, respectively. The base of the pnp transistor 148 is electrically coupled to a common junction point where the resistors 144 and 145 are electrically connected to each other.

A varying circuit 150 provided in association with the reference voltage generating circuit 135 is constructed as follows. A capacitor 151 is electrically connected in parallel with the resistor 133 in the reference voltage generating circuit 135. A series circuit comprising a resistor 152 and a diode 153 with the illustrated polarity is electrically connected in parallel with the capacitor 151. Further, diode 154a, and diode 154b with the illustrated polarities are electrically connected to a common junction point Q between the resistor 152 and the diode 153 and the terminal Ta (the collector of the transistor 148), and to the common junction point Q and the terminal Tb (the collector of the transistor 149), respectively.

Incidentally, a diode 155 with the illustrated polarity, which is used to protect the transistors 148 and 149, is electrically connected between the above point Q and the auxiliary bus Lb.

Figure 6:
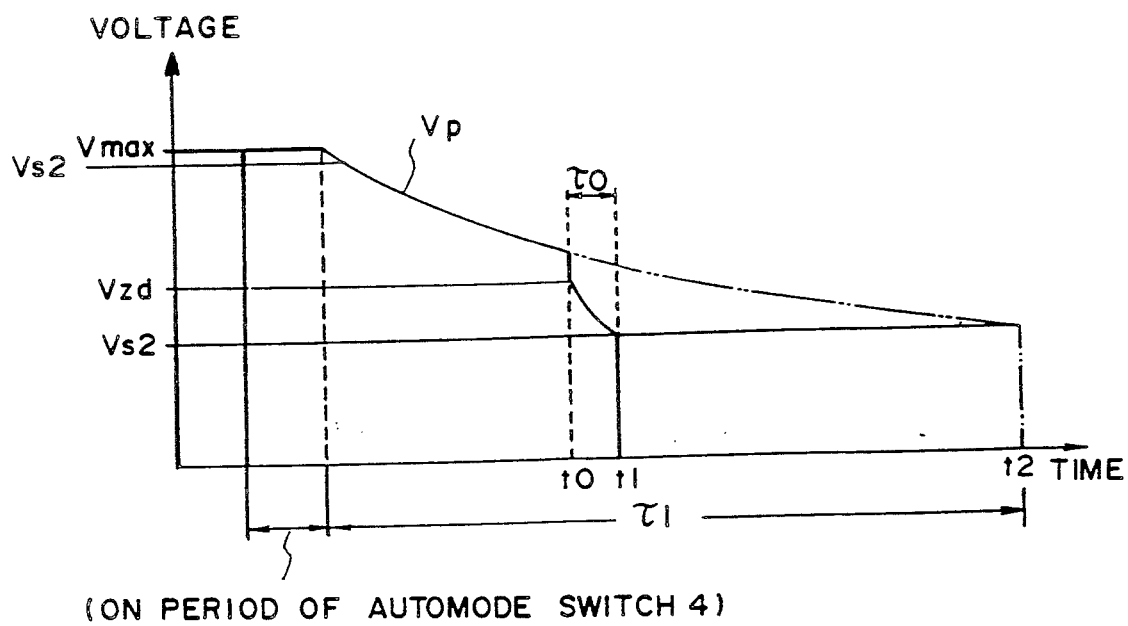
FIG. 6 is a characteristic diagram showing an electric discharge of a capacitor used to describe the operation of the second embodiment.

The operation of the second embodiment constructed as described above will now be described below with reference to FIGS. 5 and 6.

(a) When it is desired to move the window glass upward or downward in a manual mode;

When it is desired to move the window glass upward, the manually-operated window glass move-up switch 102 is turned on. As a consequence, a voltage is applied to the relay coil 109b of the first relay 109 from the d.c. power terminal 105 through the diode 106 and the switch 102, so that the first relay 109 is actuated, thereby making the two contacts (c and a) of the relay switch 109a connect.

As a result, an electrical path is formed for causing current in the direction indicated by the arrow UP in the drawing, i.e., in the forward direction, to flow in the motor 108, so as to move the window glass upward. When the switch 102 is turned off at the time that the window glass is elevated, the relay coil 109b is de-energized. Therefore, the relay switch 109a is reset to make the two contacts (c and b) connect, so that the above electrical path of the motor 108 is cut off. Correspondingly, the movement of the window glass in the upward direction is stopped.

When it is desired to move the window glass downward, the manually-operated window glass move-down 110b of the second relay 110 is energized to make the two contacts (c and a) of the relay switch 110a connect. Therefore, an electrical path is formed for causing current in the direction indicated by the arrow DOWN, i.e., in the reverse direction, to flow in the motor 108, so as to move the window glass downward. When the switch 103 is turned off at the time the window glass is moved downward, the relay coil 110b is de-energized to reset the relay switch 110a so as to make the two contacts (c and b) connect, thereby cutting off the reverse-direction electrical path of the motor 108. Thus, the window glass is stopped from being moved downward.

Incidentally, when the window glass is being moved upward or downward in the manual mode as described above, the capacitor 115 is in a non-charged state. Therefore, the relation between the detection voltage Vp from the point P and the reference voltage $Vs_2$ from the reference voltage generating circuit 135 is represented by the inequality $Vp < Vs_2$. Thus, the second comparing circuit 136 is in the on state with its output resistance decreased and hence the transistor 142 is held off. Accordingly, the transistor 148 or 149 is no longer changed from the off state to the on state immediately after the switches 102 and 103 are turned off (b) When it is desired to move the window glass upward in an auto mode:

When the automode switch 104 is also turned on after the switch 102 is turned on, an electrical path for energization of the relay coil 109b and an electrical path for causing current in the forward direction to flow in the motor 108 are defined by making the two contacts (c and a) of the relay switch 109a connect as described in part (a) above. The movement of the window glass in the upward direction is then initiated correspondingly. Under this condition, the d.c. power terminal 105 and the ground terminal are electrically connected to each other through the two contacts (c and a) of the relay switch 109a, the diodes 111a, 117a, the resistor 116, the bus La and the diode 114. Therefore, a d.c. constant-voltage output is supplied between the bus La and the auxiliary bus Lb (electrically connected to the ground terminal) so as to establish a voltage to be applied to the control circuit 107.

However, upon turning on the automode switch 104, the first comparing circuit 123 is in the off state, as can be understood from the following description. Therefore, the capacitor 115 is charged immediately, through the resistor 118 and the diode 119 (the time necessary for the charging the capacitor 115 is 0.01 second or so). Thus, as shown in FIG. 6, the detection voltage Vp at the point P is increased instantaneously up to the maximum voltage Vmax (corresponding to a voltage obtained by dividing the supply voltage with the resistors 118 and 120). As a result, the detection voltage Vp becomes greater than the reference voltage $Vs_2$ from the reference voltage generating circuit 135, and hence the second comparing circuit 136 is changed from the on state to the off state. The transistor 142 is supplied with the base current through the resistors 141 and 143 correspondingly, so that the transistor 142 is turned on.

When switch 102 is subsequently turned off after the switch 104 is turned off, the two electrically-connected contacts (c and a) of the relay switch 109a are not turned off immediately, but are turned off after a slight "delay time" elapses. Thus, since the transistor 142 has been turned on at the time when the switch 102 is turned off, the transistor 148 is also turned from the off state to the on state. As a result, an electrical path for energizing the relay coil 109b of the first relay 109 is formed by the two normally-open contacts (c and a) of the relay switch 109a, the diode 111a and the transistor 148. In addition, the transistor 148 is held on by the second comparing circuit 136, the transistor 142 or the like.

When the transistor 148 is activated to hold the electrical energization path of the relay coil 109b on, the electrical path for causing the current in the forward direction to flow in the motor 108 is continuously established even when the switches 104 and 102 are turned off. Thus, the window glass is automatically moved upward.

When the window glass is automatically elevated and reaches the maximum elevated position (where the window glass is fully closed) as described above, the motor 108 is de-activated or locked to cause a relatively large lock current to flow therein. Thus, the voltage drop across the current detecting resistor 11 is increased correspondingly. When the cut-off voltage Vd applied to the terminal Tf becomes greater than the auxiliary reference voltage $Vs_1$ supplied from the auxiliary reference voltage generating circuit 122 with this increase in voltage drop, the first comparing circuit 123 is changed from the off state to the on state.

As a consequence, the electric charge stored in the capacitor 115 is discharged through the resistors 130 and 131, and the output terminal of the first comparing circuit 123. However, the detection voltage Vp at the point P is clamped to the zener diode Vzd of the diode 132 at the time that the discharge of the capacitor 115 is initiated, at a time $t_0$ as indicated in FIG. 6. Thus, the detection voltage Vp is gradually reduced from the thus-clamped voltage Vzd at a rate in proportion to the resistance values of the resistors 130 and 131. When the detection voltage Vp reaches a point lower than the reference voltage $V_{s2}$ (as indicated at a time $t_1$ in FIG. 6) as the time $\tau_0$ (about 0.7 second) elapses after the discharge of the capacitor 115 is initiated, the second comparing circuit 136 is turned from the off state to the on state.

Thus, the base current supplied to the transistor 142 through the resistors 141 and 143 is delivered to the output terminal of the second comparing circuit 136, so that the transistor 142 is turned off, thereby turning off the transistor 148. As a result, the relay coil 109b is de-energized to reset the relay switch 109a so as to make the two contacts (c and b) connect. As a consequence, the electrical path for causing the current in the forward direction to flow in the motor 108 is cut off and hence the window glass is stopped in the maximum elevated position. Incidentally, so-called tightening of the window glass is carried out during the period of the time $\tau_0$ as a result of the fact that the discharge of the electric charge stored in the capacitor 115 requires an elapse of time $\tau_0$ as described above. A surge voltage developed in the relay coil 109b is absorbed by the diodes 155 and 154a when the transistor 148 is turned off, thereby making it possible to protect the transistor 148 from being subjected to such surge voltage.

When the lock current flows in the motor 108, it may be reduced with an increase in temperature of the windings used for the motor 108. Thus, when the motor 108 is driven under the auto mode as described above, the cut-off voltage Vd does not exceed the auxiliary reference voltage $V_{s1}$ for any length of time in some cases. In this case, the energization of the motor 108 may inadvertently continue and cause undesirable effects.

Under this condition, the electric charge stored in the capacitor 115 is discharged through the resistor 120 after the automode switch 104 is turned off. Therefore, the detection voltage Vp at the point P is gradually reduced as indicated by the two-dot chained line in FIG. 6 (the time constant of the discharge circuit comprised of the capacitor 115 and the resistor 120 is about 10 seconds). When the time $\tau_1$ corresponding to the above time constant elapses and the detection voltage Vp becomes lower than the reference voltage $V_{s2}$ (as indicated at a time $t_2$ in FIG. 6), the second comparing circuit 136 is turned from the off state to the on state.

As a result, the transistors 142 and 148 are successively turned off to de-energize the relay coil 109b in the same manner as described above, thereby enabling the relay switch 109a to make the two contacts (c and b) connect. Consequently, the motor 108 is turned off. More specifically, when a predetermined period of time $\tau_1$ elapses from the time that the motor 108 starts to be driven in the auto mode, the motor 108 is automatically de-energized. It is therefore possible to previously the above-described undesired event from occurring.

Incidentally, when the second comparing circuit 136 is turned on as described above as the electric charge stored in the capacitor 115 is discharged through the resistor 120 or the resistors 130 and 131, its electric charge is discharged in a short period of time (0.1 second or so) through the diode 139 and the resistor 138. Therefore, any chattering of the second comparing circuit 136 can reliably be prevented from occurring.

(c) When it is desired to move the window glass downward in the auto mode:

When the automode switch 104 is also turned on after the manually-operated window glass move-down switch 103 is turned on, the two contacts (c and a) of the relay switch 110a are made to connect as described in part (a) above to form an electrical path for energization of the relay coil 110b and an electrical path for causing the current in the reverse direction to flow in the motor 108. The movement of the window glass downward is thus initiated and a voltage supplied to the control circuit 107 is maintained at a given level.

At this time, the capacitor 115 is charged instantaneously and the second comparing circuit 136 is changed to the off state in a similar way as in the case described in part (b) above, so that the transistor 142 is turned on. When the switch 103 is thereafter turned off (subsequent to the turning off of the automode switch 104), the transistor 149 is changed from the off state to the on state. Thus, an electrical path for energization of the relay coil 110b of the second relay 110 is formed by the two normally-open contacts (c and a) of the relay switch 110a, the diode 111b and the transistor 149. In addition, the transistor 149 is held on by the second comparing circuit 136, the transistor 142 or the like. As a result, an electrical path for causing the current in the reverse direction to flow in the motor 108 is continuously formed even when the switches 104 and 103 are turned off, thereby automatically moving the window glass downward.

When the window glass reaches the lowest position (where the window glass is fully opened), the motor 108 is de-activated or locked to cause a relatively large lock current to flow therein. Therefore, the first comparing circuit 123 is changed from the off state to the on state in a similar way as in the case described in part (b) above, and thereafter the second comparing circuit 136 is also turned to the on state as the time $\tau_0$ elapses, thus successively turning off the transistors 142 and 149. As a result, the relay coil 110b is de-energized thereby enabling the relay switch 110a to make the two contacts (c and b) connect. Therefore, the electrical path for causing the current in the reverse direction to flow in the motor 108 is cut off and hence the window glass is stopped in the lowest position. At this time, a surge voltage developed in the relay coil 110b is absorbed by the diodes 155 and 154b at the time of turning off of the transistor 149, thereby reliably protecting the transistor 149 from being subjected to the surge voltage.

Incidentally, the description of other operations will be omitted because they are identical to those in part (b) above.

(d) When it is desired to stop the window glass from being elevated in a state in which the window glass is being moved upward in the auto mode:

When the window glass is being elevated in the auto mode, the capacitor 115 is in a charged state as is clearly understood from the above description, and the transistors 142 and 148 are held on correspondingly. When the manually-operated window glass move-down switch 103 is turned on only for a short period of time under this condition, the relay coil 110*b* is energized to make the two contacts (c and a) of the relay switch 110*a* connect. Thus, both terminals of the motor 108 are short-circuited through the respective two contacts (c and a) of the relay switches 109*a* and 110*a*, so that the motor 108 is de-energized to stop its rotation.

In this case, the transistor 148 is in the on state and hence the potential (i.e., voltage) at the cathode of the diode 154*a* is increased to the level of the supply voltage in the varying circuit 150. However, when the switch 103 is turned on as described above, the potential or voltage at the cathode of the diode 154*b* is also raised to the level of the supply voltage. As a result, the diodes 154*a* and 154*b* are both reverse-biased, thereby raising the voltage at the point Q in the drawing, which has been so far set to the level of the ground potential, to the supply voltage level. Thus, the resistor 152 is electrically connected in parallel with the resistor 133 in the reference voltage generating circuit 135, and the sum of the resistance values of the resistors 133 and 152 is reduced. Therefore, the output of the reference voltage generating circuit 135 varies and reaches a reference voltage $Vs'_2$ (see FIG. 6) near the maximum voltage Vmax. Thus, the detection voltage Vp becomes smaller than the second reference voltage $Vs'_2$, and hence the second comparing circuit 136 is changed from the off state to the on state so as to turn off the transistors 142 and 148. At the same time, the electric charge stored in the capacitor 115 is rapidly discharged through the diode 139 and resistor 138.

As a result, the relay coil 109*b* is de-energized thereby enabling the relay switch 109*a* to make the two contacts (c and b) connect. On the other hand, when the switch 103 is turned off after it has been turned on only for a short period of time as described above, the relay coil 110*b* is de-energized so as to enable the relay switch 110*a* to make the two contacts (c and b) connect. As a consequence, the motor 108 is de-energized so as to be placed in the initial state.

Incidentally, the de-actuation of each of the relays 109 and 110 is performed in a state before the turning on of the switch 103 is released, i.e., in a state in which the voltage supplied to the control circuit 7 is held constant by the switch 103. Thus, the voltage at the point Q is reduced to the original potential level immediately after the respective relays 109 and 110 are de-actuated, and hence the output of the reference voltage generating circuit 135 is reset to the reference voltage $Vs_2$ in response to the reduction in the voltage at the point Q. However, the resetting of the output from the reference voltage generating circuit 135 to the reference voltage $Vs_2$ is delayed by a period during which the current for charging the capacitor 151 flows into the capacitor 151. Consequently, the second comparing circuit 136 can be prevented from malfunctioning.

(e) When it is desired to stop the movement of the window glass in the downward direction while it is being moved downward in the auto mode:

While the window glass is being moved downward in the auto mode, the capacitor 115 is in a charged state, and the transistors 142 and 149 are turned on correspondingly. When the manually-operated window glass move-up switch 102 is turned on only for a short period of time under this condition, the motor 108 is deactivated immediately and the electric charge stored in the capacitor 115 is rapidly discharged through the diode 139 and the resistor 138 as in the description in part (d) above. When the switch 102 is subsequently turned off, the motor 108 is de-energized so as to be placed in the initial state.

According to the present embodiment described above, the relay coils 109*b* and 110*b* of the first and second relays 109 and 110 actuated at the time of the manual mode are energized directly through the first and second manually-operated mode switches 102 and 103, respectively. Therefore, the present embodiment is not subjected to reduction in the reliability of relay control as in the conventional example of such a type that the relays are controlled through semiconductor switching devices.

Further, according to the present embodiment, the transistor 149 for controlling the second relay 110 which is used to form the electrical path for causing the current in the reverse direction to flow in the motor 108 is electrically disconnected from the d.c. power terminal 105 in the state in which the window glass is being moved upward in the auto mode, i.e., in the state in which the transistor 148 is held on and the electrical path for causing the current in the forward direction to flow in the motor 108 is formed by the first relay 109. In the present embodiment, the transistor 148 used to form the electrical path for causing the current in the forward direction to flow in the motor 108 is also separated from the d.c. power terminal 105 in the state in which the window glass is being moved downward in the auto mode, i.e., in the state in which the transistor 149 is held on and the electrical path for causing the current in the reverse direction to flow in the motor 108 is formed by the second relay 110. Thus, no supply voltage is applied to either the transistor 149 or 148 in the course of the movement of the window glass upward or downward in the auto mode. It is therefore possible to avoid a tendency for the transistor 149 or 148 to malfunction due to noise or the like as a result of changing the movement of the window glass in upward or downward directions irregularly, Thus, the reliability of relay control executed by the control circuit 107 can be further improved.

Furthermore, in the present embodiment, since the diodes 154*a* and 154*b* in the varying circuit 150 provided to stop the movement of the window glass in the auto mode in the middle of its movement serve as flywheel diodes used for the protection of the transistors 148 and 149, the number of components in the control circuit 107 can be reduced.

If the auto-stop function (which detects the lock current flowing in the motor 108 to stop the window glass from being moved upward and downward) for automatically stopping the movement of the window glass in the upward or downward direction under the auto mode is impaired, the movement of the window glass upward and downward can be stopped by using the function of the timer comprising the capacitor 115 and the resistor 120, after a predetermined period of time elapses. It is thus possible to avoid the possibility of the motor 108 being energized for a long period of time while it is still in its locked state. In addition, there is no risk of the motor 108 being overheated and the automobile battery being excessively consumed.

According to each of the present embodiments, as has clearly been understood from the above description, when the window glass is moved upward or downward in the manual mode, the first and second relays respectively used to form the electrical paths for causing the currents in the forward and reverse directions to flow in the motor ar controlled directly by the first and second manually-operated mode switches, respectively. On the other hand, when the window glass is moved upward or downward in the auto mode, either one of the first and second semiconductor switching devices for controlling the first and second relays respectively, in spite of the activation of the auto mode, is electrically disconnected from the power supply.

It is therefore possible by means of the present invention to improve the reliability of control by the control circuit at the time of the manual mode, and in addition, each of the semiconductor switching devices can be prevented from malfunctioning, as well as an improvement in the reliability of control by the control circuit at the time of the auto mode can also be realized.

Having now fully described the invention, it will be apparent to those skilled in the art that many changes and modifications can be made without departing from the spirit or scope of the invention as set forth herein.

What is claimed is:

1. A control apparatus suitable for use in a power window regulator, comprising:
    first and second relays selectively actuated when first and second manually-operated mode switches are turned on and used to form an electrical path for causing electric current in a forward direction to flow in an electric motor and to form an electrical path for causing electric current in a reverse direction to flow in said motor, respectively, said motor being activated to move a window glass in directions in which it is closed and opened in response to the supply to said motor of said electric current caused to flow in said forward and reverse directions when said first and second relays are respectively actuated;
    an automode switch for activating an automatic mode for automatically moving said window glass to one of a position where said window glass is fully closed and a position where said window glass is fully opened when either one of said first and second relays is actuated to turn on;
    a capacitor serving as a component of a timer, for discharging an electric charge stored therein after said capacitor is charged up to a predetermined voltage level upon turning on of said automode switch;
    a holding circuit for holding either one of said first and second relays in a conducting state in which said current in either forward or reverse direction is caused to flow in said motor, during a period in which a detection voltage corresponding to a voltage applied across said capacitor is greater than a reference voltage;
    a cut-off circuit for discharging said electric charge stored in said capacitor when said window glass is moved to one of said positions where it is fully closed and opened; and
    a varying circuit for changing said reference voltage to be a level higher than said detection voltage when said first and second relays are both actuated.

2. A control apparatus according to claim 1, further comprising a clamping circuit for clamping said detection voltage to a constant voltage higher than said reference voltage when the discharge of said electric charge stored in said capacitor is initiated by said cut-off circuit.

3. A control apparatus according to claim 2, further comprising a voltage varying circuit activated so as to reduce said reference voltage when the discharge of said electric charge stored in said capacitor is initiated by said cut-off circuit.

4. A control apparatus according to claim 1, wherein said automode switch is arranged so as to be turned on together with said turning on of either one of said first and second relays, and said first and second relays have relay coils energized when said first and second manually-operated mode switches are turned on, and normally-open contacts turned on when said relay coils are energized, respectively, said apparatus further including a first semiconductor switching device for forming an electrical path for energization of said relay coil of said first relay, through said normally-open contacts of said first relay, when said automode switch is turned on together with said first manually-operated mode switch, and a second semi-conductor switching device for forming an electrical path for energization of said relay coil of said second relay, through said normally-open contacts of said second relay, when said automode switch is turned on together with said second manually-operated mode switch.

5. A control apparatus according to claim 4, wherein one of two terminals of said relay coil of said first relay is electrically connected to a power supply through said first manually-operated mode switch whereas the other thereof is electrically connected to ground, and one of two terminals of said relay coil of said second relay is electrically connected to the power supply through said second manually-operated mode switch whereas the other thereof is electrically connected to the ground.

6. A control apparatus according to claim 2, wherein said clamping circuit comprises a voltage-regulator diode electrically connected between the output terminal of said cut-off circuit and a detection-voltage input terminal of said holding circuit.

7. A control apparatus according to claim 3, wherein said voltage varying circuit comprises a diode whose cathode is electrically connected to the output terminal of said cut-off circuit and a resistor whose one end is electrically connected to the anode of said diode and whose other end is electrically connected to a reference-voltage input terminal of said holding circuit.

8. A control apparatus suitable for use in a power window regulator, comprising:
    a first manually-operated mode switch turned on by an external operation;
    a second manually-operated mode switch turned on by an external operation;
    an automode switch turned on together with the turning on of either one of said first and second manually-operated mode switches;
    an electric motor for moving a window glass in one of two directions in which said window glass is closed and opened, respectively, in response to the supply to said motor of electric current in forward and reverse directions;
    a first relay for causing electric current in said forward direction to flow in said motor when said first manually-operated mode switch is turned on;
    a second relay for causing electric current in said reverse direction to flow in said motor when said second manually-operated mode switch is turned on;
    a capacitor serving as a component for a timer, for discharging an electric charge stored in said capacitor after said capacitor is charged up to a predetermined voltage level upon turning on of said automode switch;

a holding circuit for holding either one of said first and second relays in a conducting state in which electric current in one of said forward and reverse directions is caused to flow in said motor, during a period in which a detection voltage corresponding to a voltage applied across said capacitor is greater than a reference voltage;

a cut-off circuit for discharging said electric charge stored in said capacitor when said window glass is moved to a position where it is fully closed or opened; and a varying circuit for changing said reference voltage to a level higher than said detection voltage when said first and second relays are both actuated to energize said motor.

9. A control apparatus according to claim 8, further comprising a clamping circuit for clamping said detection voltage to a constant voltage higher than said reference voltage when the discharge of said electric charge stored in said capacitor is initiated by said cut-off circuit.

10. A control apparatus according to claim 9, further comprising a voltage varying circuit activated so as to reduce said reference voltage when the discharge of said electric charge stored in said capacitor is initiated by said cut-off circuit.

11. A control apparatus according to claim 8, wherein said first and second relays have relay coils energized when said first and second manually-operated mode switches are turned on, and normally-open contacts turned on when said relay coils are energized, respectively, said apparatus further including a first semi-conductor switching device for forming an electrical path for energization of said relay coil of said first relay, through said normally-open contacts of said first relay, when said automode switch is turned on together with said first manually-operated mode switch, and a second semiconductor switching device for forming an electrical path for energization of said relay coil of said second relay, through said normally-open contacts of said second relay, when said automode switch is turned on together with said second manually-operated mode switch.

12. A control apparatus according to claim 11, wherein one of two terminals of said relay coil of said first relay is electrically connected to a power supply through said first manually-operated mode switch, whereas the other thereof is electrically connected to ground, and one of both terminals of said relay coil of said second relay is electrically connected to the power supply through said second manually-operated mode switch, whereas the other thereof is electrically connected to the ground.

13. A control apparatus according to claim 9, wherein said clamping circuit comprises a voltage-regulator diode electrically connected between the output terminal of said cut-off circuit and a detection-voltage input terminal of said holding circuit.

14. A control apparatus according to claim 10, wherein said voltage varying circuit comprises a diode whose cathode is electrically connected to the output terminal of said cut-off circuit and a resistor whose one end is electrically connected to the anode of said diode and whose other end is electrically connected to a reference-voltage input terminal of said holding circuit.

15. A control apparatus suitable for use in a power window regulator, comprising:

a first manually-operated mode switch turned on by an external operation;

a second manually-operated mode switch turned on by an external operation;

an automode switch turned on together with the turning on of either one of said first and second manually-operated mode switches;

an electric motor for moving a window glass in directions in which said window glass is closed and opened respectively in response to the supply to said motor of electric current in forward and reverse directions;

a first relay for causing electric current in said forward direction to flow in said motor in response to the turning on of said first manually-operated mode switch;

a second relay for causing electric current in said reverse direction to flow in said motor in response to the turning on of said second manually-operated mode switch;

a capacitor serving as a component for a timer, for discharging an electric charge stored in said capacitor after said capacitor is charged up to a predetermined voltage level upon turning on said automode switch;

a holding circuit for holding either one of said first and second relays in a conducting state in which electric current in one of said forward and reverse directions is caused to flow in said motor, during a period in which a detection voltage corresponding to a voltage applied across said capacitor is greater than a reference voltage;

a cut-off circuit for discharging said electric charge stored in said capacitor when said window glass is moved to one of a position where it is fully closed and a position where it is fully opened;

a varying circuit for changing said reference voltage to a level higher than said detection voltage when said first and second relays are both actuated to energize said motor; and a clamping circuit for clamping said detection voltage to a constant voltage higher than said reference voltage when the discharge of said electric charge stored in said capacitor is initiated by said cut-off circuit;

said first and second relays having relay coils energized when said first and second manually-operated mode switches are turned on, and normally-open contacts turned on when said relay coils are energized, respectively;

said apparatus further including a first semiconductor switching device for forming an electrical path for energization of said relay coil of said first relay, through said normally-open contacts of said first relay, when said automode switch is turned on together with said first manually-operated mode switch, and a second semiconductor switching device for forming an electrical path for energization of said relay coil of said second relay, through said normally-open contacts of said second relay, when said automode switch is turned on together with said second manually-operated mode switch.

16. A control apparatus according to claim 15, wherein one of two terminals of said relay coil of said first relay is electrically connected to a power supply through said first manually-operated mode switch, whereas the other thereof is electrically connected to ground, and one of two terminals of said relay coil of said second relay is electrically connected to the power supply through said second manually-operated mode switch, whereas the other thereof is electrically connected to the ground.

17. A control apparatus according to claim 16, wherein said clamping circuit comprises a voltage-regulator diode electrically connected between the output terminal of said cut-off circuit and a detection-voltage input terminal of said holding circuit.

* * * * *